April 21, 1931.                L. ROTTENBURG                1,802,187
                    TUNING SCALE FOR WIRELESS APPARATUS
                    Filed Oct. 20, 1930          2 Sheets-Sheet 1

April 21, 1931.  L. ROTTENBURG  1,802,187
TUNING SCALE FOR WIRELESS APPARATUS
Filed Oct. 20, 1930  2 Sheets-Sheet 2

Patented Apr. 21, 1931

1,802,187

UNITED STATES PATENT OFFICE

LOUIS ROTTENBURG, OF GLASGOW, SCOTLAND

TUNING SCALE FOR WIRELESS APPARATUS

Application filed October 20, 1930, Serial No. 489,810, and in Great Britain November 7, 1929.

This invention consists in a tuning scale for wireless apparatus including a stationary scale member formed with a slot or a number of equispaced slots, and an index member movable behind said scale member in a direction transverse to said slot or slots, said index member presenting an index inclined to and visible or partly visible through said slot or slots.

The index member may be constituted by the inclined edge of a set-square of a colour contrasting with that of the scale member, said set-square constituting the index member, the base of the set-square being perpendicular to the slot or slots in the scale member and of a length approximately equal to the distance between adjacent slots in the scale member, the height of the set-square being approximately equal to the length of the slots.

The index member may be illuminated from behind, e. g., by means of a neon lamp in series with the output anode of the wireless set.

Station names, wave length scales and frequency scales may be applied to a front panel constituting the scale member between the slots therein. Preferably there are used station name-labels movably fitted to such panel.

The index member may be moved rectilinearly behind the scale member by operation of a pinion mounted on the tuning spindle and geared directly or indirectly to a horizontal rack connected to the index member so that the full movement of the condensers (half a turn) will move the index member through the range of its travel.

The tuning-knob and the pinion may be mounted on a push-pull spindle, endwise movement of which moves a contact-arm over a rheostat connected in parallel to the loud-speaker.

In lieu of rack and pinion mechanism equivalent mechanism may be interposed between the index member and the condenser.

In a modified construction the index member is provided with an inclined slot or behind which is arranged a neon tube inductively coupled to the output anode circuit of the wireless set, so that, when a desired station is tuned in, the tube glows with a maximum glow. Viewed from the front, only a faint spot of light may be seen through the proper slot in the scale member, but, whenever a station is approached, the tube will glow more brilliantly and will be brightest when tuning is sharpest.

Figure 1:
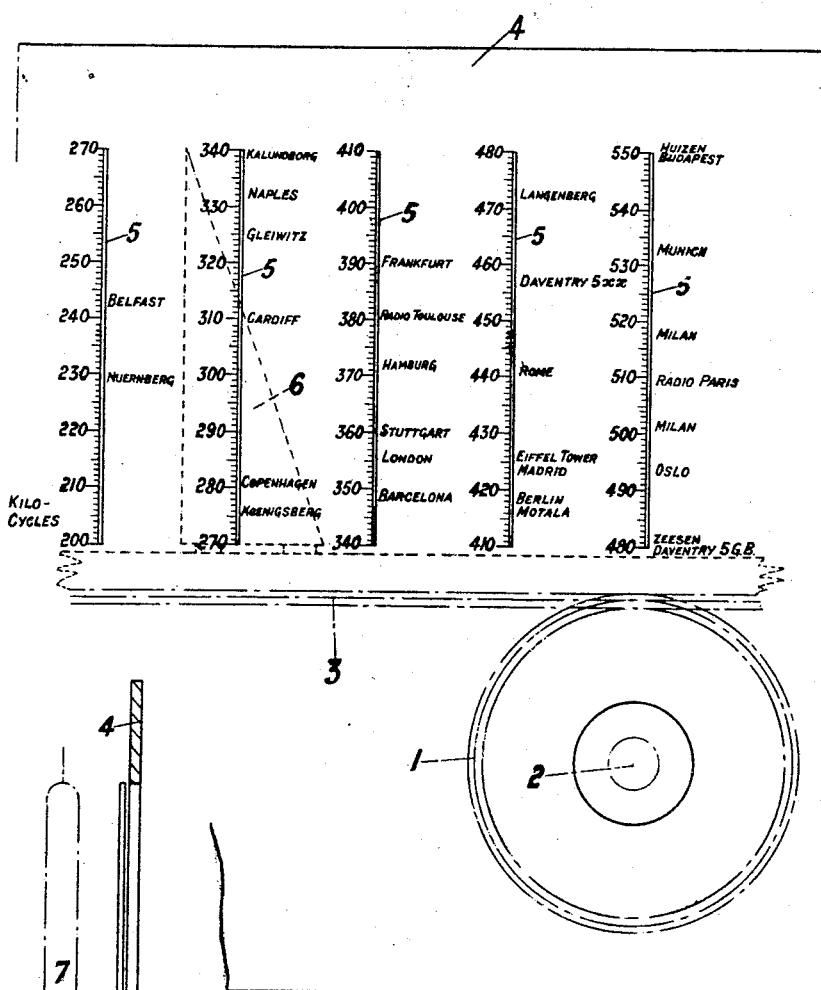
Figure 2:
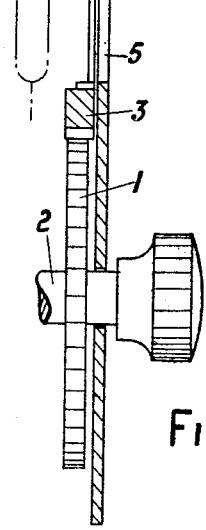

The invention is illustrated diagrammatically in the accompanying drawing in which Fig. 1 is a front view and Fig. 2 a transverse section.

Figure 3:
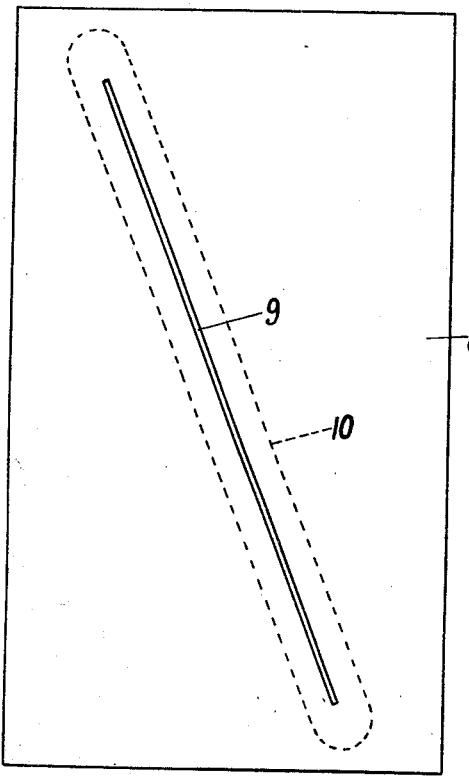
Figure 4:
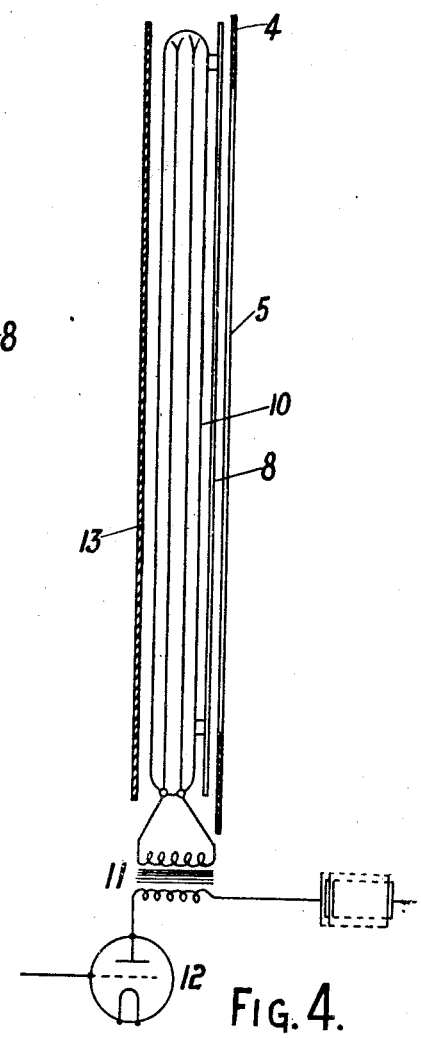
Figure 5:
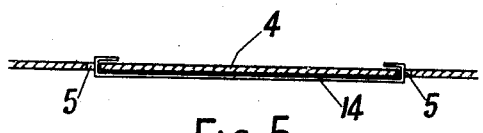

Fig. 3 is an elevation showing a modified form of index member, and Fig. 4 is a cross section showing the arrangement of said modified index member behind the scale member. Fig. 5 is a fragmentary horizontal section showing a station name-label adjustably fitted to the scale member.

As shown, a spur wheel 1 is mounted on the single-knob tuning spindle 2 and meshing with a horizontal rack 3 guided for horizontal sliding movement behind a front panel 4 of black coloration. At intervals equally spaced apart five narrow vertical slots 5 are cut through the front panel 4. A right-angled triangular set-square 6 of white coloration is mounted on the rack 3, close behind the panel 4. Starting with the rack 3 in the extreme left hand position, with the vertical edge of the set-square to the left, and only the tip of the toe of the set-square showing at the bottom of the left-hand slot 5, as the rack is moved to the right the white column seen through said slot 5 will appear to grow longer upwards, like milk rising in a capillary tube. The white column having mounted to the top of the first slot, further movement of the rack will cause this column to vanish and the toe of the set-square will appear at the bottom of the second slot 5, and so on.

7 denotes a source of light for illuminating the index from behind.

According to a modification there is mounted on the rack 3 an index member 8 (Figs. 3 and 4) provided with an inclined slot 9 behind which is arranged a neon tube 10 carried by said member 8 and connected as shown to the output winding of a step-up transformer 11 of which the input winding is included in the anode circuit of the last or power valve 12 of the wireless set. As will readily be understood, a faint spot only of light will be visible to the operator at the point of intersection of the slot 9 with one or other of the slots 5 in the front panel 4, the light being most intense when tuning is sharpest. 13 denotes a stationary back screen, which, like the member 8, is of black coloration.

As shown in Fig. 5, station name-labels may be constituted as vertically adjustable clips 14 extending between adjacent slots 5 in the panel 4.

I claim:—

1. In a tuning scale for wireless apparatus in combination, a stationary scale member formed with at least one slot and an index member movable behind said scale member in a direction transverse to said slot, said index member presenting an index inclined to and visible through said slot.

2. The combination claimed in claim 1 in which the scale member is provided with a number of equispaced slots and the index member is constituted as a right-angled set-square of a colour contrasting with that of the scale member, the base of the set-square being perpendicular to said slots and of a length approximately equal to the distance between adjacent slots in the scale member, and the height of the set-square being approximately equal to the length of said slots.

3. The combination with the elements recited in claim 1 of means for illuminating the index from behind.

4. The combination claimed in claim 1 in which the scale member is provided with a number of parallel equispaced slots and markings are applied to the scale member between the slots.

5. The combination claimed in claim 1 in which station name-labels are movably fitted to the scale member.

In testimony whereof I have signed my name to this specification.

LOUIS ROTTENBURG.